United States Patent [19]

Rabinowitz et al.

[11] 4,064,333

[45] Dec. 20, 1977

[54] PROCESS FOR THE HIGH MOLECULAR WEIGHT POLYMERS OF DIALLYLDIMETHYLAMMONIUM FLUORIDE POLYMERS DIRECTLY FROM DIALLYLDIMETHYLAMMONIUM FLUORIDE MONOMER

[75] Inventors: Robert Rabinowitz, Stamford; Richard Parke Welcher, Old Greenwich, both of Conn.

[73] Assignee: American Cyanamid Company, Stamford, Conn.

[21] Appl. No.: 778,000

[22] Filed: Mar. 16, 1977

[51] Int. Cl.$^2$ ............................................... C08L 47/00
[52] U.S. Cl. ................................. 526/77; 260/29.7 H; 260/29.7 R; 526/248

[58] Field of Search .................................. 526/77, 248; 260/29.7 R, 29.7 H

[56] References Cited

U.S. PATENT DOCUMENTS

| 3,288,770 | 11/1966 | Butler | 260/29.7 R |
|---|---|---|---|
| 3,514,435 | 5/1970 | Ardis et al. | 526/77 |

*Primary Examiner*—Eugene C. Rzucidlo
*Attorney, Agent, or Firm*—William J. van Loo

[57] ABSTRACT

Under specified conditions of reaction, a substantially pure aqueous solution of diallyldimethylammonium fluoride monomer can be polymerized to provide corresponding polymers having an intrinsic viscosity of at least about 0.1 deciliter per gram measured in 1.0 N NaCl solutions.

6 Claims, No Drawings

PROCESS FOR THE HIGH MOLECULAR WEIGHT POLYMERS OF DIALLYLDIMETHYLAMMONIUM FLUORIDE POLYMERS DIRECTLY FROM DIALLYLDIMETHYLAMMONIUM FLUORIDE MONOMER

This invention relates to a process for preparing a polymer of diallyldimethylammonium fluoride directly from a monomer of diallyldimethylammonium fluoride. More particularly, this invention relates to such a process wherein a substantially pure monomer of diallyldimethylammonium fluoride is used.

A process for preparing high molecular weight polymers from diallyldimethylammonium chloride is described in U.S. Pat. No. 3,288,770, issued Nov. 29, 1966 to G. B. Butler. In the reference the patentee teaches that high molecular weight polymers can only be obtained when the starting quaternary monomer is in the form of the chloride salt and that other salt forms of the quaternary monomer provide only low molecular weight polymers or no polymers at all. As a means of obtaining high molecular weight quaternary salt polymers with other counter ions the patentee teaches suitable ion exchange of high moelcular weight quaternary polymers in chloride salt form.

Polyquaternary polymers based on diallyldimethylammonium salts are effective flocculants in a wide variety of applications. Generally, flocculation efficiency increases with increasing molecular weight of such polymers and higher molecular weight polymers can reduce the dosage requirements for an effective flocculation in many applications. For certain applications, higher moleclar weight diallyldimethylammonium salt polymers than those currently provided would be desirable for increased efficiency. However, at the current state of the art as taught by the Butler reference, the ultimate in high molecular weight diallyldimethylammonium salt polymers is that obtainable from the polymerization of diallyldimethylammonium chloride.

In support of the anomalous performance of the diallyldimethylammonium chloride monomer in polymerization reactions, an affidavit was presented in the prosecution of the Butler patent application. In the affidavit, in a series of polymerizations conducted under the same reaction conditions, only the diallyldimethylammonium chloride monomer provided a polymer of significant intrinsic viscosity thus dissuading anyone from further study of these polymerization reactions. In preparing the various anion species of the diallyldimethylammonium salt monomer, a sample of diallyldimethylammonium chloride was prepared by the dropwise addition of 2.0 moles of alkyl chloride to 1 mole of dimethylamine, followed by caustic treatment, reflux, removal of volatile organic materials, filtration to remove sodium chloride, and subsequent dilution with water. This sample of diallyldimethylammonium chloride was then converted to the various other anionic forms as follows: The solution of diallyldimethylammonium chloride was treated with silver oxide in 10% excess of stoichiometric requirements; the liquid was decanted and filtered to yield the quaternary monomer in the form of the free base, i.e., the hydroxide; the free base was then converted to the salt with the anion species desired by the addition of suitable acid, the solution filtered to remove precipitated solids, concentrated under vacuum and adjusted to 50% solids concentration. The various anionic species thus obtained were than compared in the same polymerization reaction for reactivity against a sample of the diallyldimethylammonium chloride from which the other anionic species were prepared. In reporting the results obtained with the fluoride salt, the affidavit state " . . . the degree of polymerization appeared to be nil."

Accordingly, there exists the need for a process for preparing polymers of diallyldimethylammonium fluoride directly from the fluoride monomer, especially such a process wherein the diallyldimethylammonium fluoride polymer is of higher molecular weight than is the corresponding diallyldimethylammonium chloride polymer under identical conditions of preparation. Such a process would satisfy a long felt need and provide a significant advance in the art.

In accordance with the present invention, there is provided a process for preparing a polymer of diallyldimethylammonium fluoride having an intrinsic viscosity of at least about 0.1 deciliter/gram which comprises: providing an aqueous solution of about 10–70 weight percent of a substantially pure diallyldimethylammonium fluoride; purging said solution to remove oxygen therefrom; initiating polymerization of the purged monomer by addition thereto of a catalytic amount of a free-radical catalyst; conducting the polymerization at a temperature of at least about 50° C. until a polymer of an intrinsic viscosity of at least about 0.1 deciliter/gram is obtained; and thereafter recovering the polymer thus obtained.

The process of the present invention provides polymers of diallyldimethylammonium fluoride directly from the quaternary fluoride monomer. In preferred instances, the present invention provides such polymers at intrinsic viscosities that are significantly higher than those obtained with the corresponding chloride monomer under identical conditions of reaction. This result is highly surprising and totally unexpected in view of the prior art teachings. By providing hiher molecular weight diallyldimethylammonium salt polymers than can be obtained by prior art procedures, the process of the present invention enables flocculation processes to be effectively run with lower polymer dosages than previously required, enables more effective use to be made of flocculation processes wherein extremely high molecular weight polymers are required, and eliminates the necessity for ion exchange to obtain diallyldimethylammonium fluoride polymers.

In carrying out the process of the present invention, there is first provided a substantially pure aqueous solution of diallyldimethylammonium fluoride. The aqueous solution may be available commercially, may arise from other processing, or may be prepared for use. By "substantially pure" is meant that the monomer solution should be free from inhibitory concentrations of those substances which inhibit the effective polymerization reaction of diallyldimethylammonium fluoride. Impurities in the monomer solution in general can be inhibitors of the polymerization reaction and, accordingly, control of the purity of the monomer solution is critical. A convenient method for controlling the extend of purity of the monomer is to control the method by which the monomer is prepared. For example, a substantially pure aqueous solution of diallyldimethylammonium fluoride can be provided by reacting allylfluoride with dimethylamine following the procedure described above with respect to diallyldimethylammonium chloride. An alternative procedure for providing a substantially pure aqueous solution of diallyldimethylammonium fluoride monomer is to ion-exchange a substantially pure aqueous solution of diallyldimethylammonium chloride monomer. Impure aqueous solutions of the fluoride monomer can also be transformed to a substantially pure form by repeated re-crystallizations or extractions of the monomer. Other appropriate methods of purification may also be employed. The substantially pure monomer solution should generally contain about 10 to about 70 weight percent of monomer content, preferably about 20 to 60 weight percent. High solution concentrations generally provide polymers of higher intrinsic viscosities and, accordingly, are preferred when high polymers are desired.

After the substantially pure monomer solution is provided as described, it is next purged of oxygen. This is readily accomplished by sparging with nitrogen or other suitable inert gas. The purged monomer solution is next initiated by the addition of a catalytic amount of a suitable free-radical catalyst thereto. Suitable free-radical catalysts and catalytic amounts thereof are those conventionally employed in free-radical polymerizations and are well documented in the literature. After the monomer solution is initiated as indicated, the polymerization is conducted at a temperature above 50° C. until a polymer of intrinsic viscosity of at least about 0.1 deciliter/gram is obtained.

The choice of free radical catalyst, polymerization time and polymerization temperature will be made in accord with principles well known to those skilled in polymerization techniques. The temperature will depend on the catalyst used, and the product viscosity desired. In general, a lower temperature will lead to a higher viscosity. The polymerization time will depend on the temperature selected, and the degree of conversion of monomer to polymer desired. In general a longer time will be required for a high conversion when a lower polymerization temperature is maintained, and a shorter time at a higher temperature. The combined effect of catalyst, time and temperature should be such as to cause substantially complete conversion, to provide the most effective performance as a flocculant. Although purging of the polymerizing monomer solution is not necessary to provide desirable polymers, use of a slow sweep of nitrogen across the surface of the polymerizing solutions tends to improve the product obtained and is, therefore, preferred. Preferred polymers for some applications are those having an intrinsic viscosity of at least about 0.5 dl./g. Those of at least 2.0 dl./g. are preferred for other applications.

Polymerization of the aqueous monomer solution does not require any pH control, although pH control may be exercised, if desired. Thus, a substantially pure monomer solution will inherently be of a pH that can be readily polymerized, although the specific pH value may be altered.

After the polymerization reaction has been effected as described, the polymer obtained is recovered. By the expression "is recovered" is meant that the product obtained is removed from the reactor and otherwise handled as may be desirable. It may be diluted with water and/or adjusted in pH prior to or after removal from the reactor. If desired, it may be precipitated from solution by use of suitable precipitant and reconstituted as an aqueous solution or as a solution in another solvent. It is generally preferable merely to dilute the product to a solution of sufficient water content to provide a suitable bulk viscosity for subsequent utility if necessary.

Since the product obtained by the present process is the polymerization reaction product of diallyldimethylammonium fluoride, the product will be a quaternary polymer in the form of the fluoride salt. If is should be desirable to have the product in an alternative salt form, this can readily be accomplished by ion exchange as described in U.S. Pat. No. 3,288,770. By such procedure, it is possible to take advantage of the ability of diallyldimethylammonium fluoride to form higher molecular weight polymers, as indicated by intrinsic viscosity, and obtain high molecular weight polymers of other anionic species.

The invention is more fully illustrated by the examples which follow wherein all parts and percentages are by weight unless otherwise specified.

COMPARATIVE EXAMPLE A

In this example, a series of polymerizations were run using diallyldimethylammonium salt monomers of differing anion contents in separate runs. A quantity of the chloride salt was prepared by the reaction of 2.05 moles of allyl chloride with one mole of dimethylamine, followed by caustic treatment, reflux, removal of volatile organic materials, filtration to remove sodium chloride, and subsequent dilution with water, as described in the affidavit of Dr. Miller in the file history of U.S. Pat. No. 3,288,770. Portions of the resulting aqueous solution of the chloride salt were separately converted to the fluoride, iodide, bromide, sulfate and nitrate salts by converting the chloride salt to the free base with an excess of silver oxide and subsequent treatment with suitable acid, also as described in the affidavit of D. Miller. The chloride monomer employed was that prepared directly from allyl chloride and dimethylamine without silver oxide treatment. The polymerization procedure was as in the affidavit by Dr. Miller.

In each run, a 50% aqueous solution of monomer was adjusted to pH 10.0 by addition of sodium hydroxide solution. The solution in a suitable reactor was purged with nitrogen for 45 minutes at room temperature and no subsequent purging was employed. Polymerization was initiated by addition of a catalytic amount of tertiary butyl hydroperoxide to the purged monomer solution and application of heat. Heatng was such as to provide a reaction temperature of about 100° C. in a period of about 40 minutes, after which the heating was discontinued and the pH of the reaction mixture was made acidic with hydrochloric acid. The intrinsic viscosity of the resulting polymer was then determined. The following tabulation indicates the anion content of the diallyldimethylammonium salt monomer employed and the intrinsic viscosity of the polymer obtained following the preparative procedure described in the series of individual runs.

| Intrinsic Viscosity Of Polymers of Various Anionic Forms of Diallyldimethylammonium Salt Monomers | |
|---|---|
| | Intrinsic Viscosity (deciliter/gram) (In 1.0 N NaCl Solution) |
| Fluoride | Degree of Polymerization - nil |
| Iodide | 0.02 |
| Bromide | 0.07 |
| Sulfate | 0.07 |
| Nitrate | 0.09 |
| Chloride | 0.19 |

The results given above clearly show that in accordance with the prior art procedure for preparing various anionic forms of diallyldimethylammonium salt monomers, only the chloride salt monomer provides a significant value of intrinsic viscosity and that the fluoride salt monomer does not appear to polymerize at all.

EXAMPLE 1

In this example, there was employed a diallyldimethylammonium fluoride obtained by ion-exchange of the corresponding chloride monomer, which was prepared by the procedure described in Comparative Example A, except that the monomer was further purified by evaporating water from the resulting aqueous solution to attain a 55% concentration of monomer, filtering warm with filter aid, concentrating further to a 57% concentration and again filtering warm to provide a clear solution of the monomer.

A 20% aqueous solution of the fluoride monomer obtained by suitable dilution of the monomer purified as described above was sparged for 10 minutes with nitrogen. The monomer solution was then initiated with 1% tertiary-butylhydroperoxide based on the weight of monomer. The reactor was then covered, with provision for a slow flow of nitrogen above the surface of the liquid throughout the polymerization reaction. The reaction contents were then heated to a temperature of about 50° C. in about 15 minutes and held at 50° for 24 hours. The reactor contents were then heated to about 75° C. in about 15 minutes and held at 75° C. for 48 hours, the slow nitrogen flow being maintained. At the end of this time, the reactor contents were allowed to cool and subsequently removed from the reactor. The polymer obtained had an intrinsic viscosity of 0.57 dl./g. measured to 1.0 N NaCl solution (equivalent to about 1.24 dl./g. measured in 0.1 N KCl solution).

This example shows that the process of the present invention provides a high molecular weight polymer using diallyldimethylammonium fluoride monomer.

EXAMPLE 2

The procedure of Example 1 was followed except that the monomer solution contained 30% of the fluoride monomer. The polymer obtained had an intrinsic viscosity of 0.65 dl./g. measured in 1.0 N NaCl solution (equivalent to about 1.42 dl./g. measured in 0.1 N KCl solution).

This example also shows that the process of the present invention provides a high molecular weight polymer using diallyldimethylammonium fluoride monomer and indicates that the intrinsic viscosity of the resulting polymer increases with increasing concentration of the monomer solution.

EXAMPLE 3

The procedure of Example 1 was repeated in every material detail except that the monomer solution contained 54.7% fluoride monomer and the catalyst was employed at 0.8,% based on the weight of monomer.

The polymer obtained had an intrinsic viscosity of 1.73 dl./g. in 1.0 N NaCl solution, and 4.07 dl./g. measured in 0.1 N KCl solution.

EXAMPLE 4

A 49.6% aqueous solution of diallyldimethylammonium fluoride obtained by ion exchange of diallyldimethylammonium chloride was sparged with nitrogen for 10 minutes. The monomer solution was then initiated using 1% tertiary-butylhydroperoxide as catalyst. The monomer solution was then heated at 50° C. for 24 hours, followed by heating 75° C. for 48 hours, during all of which time a slow sweep of nitrogen was maintained above the liquid surface. The resulting reaction product was then diluted to provide 11% solids. Recovery of polymer from a portion of the solution yielded 64% polymer, with about 5% residual monomer in the recovered polymer. The polymer had an intrinsic viscosity of 2.47 dl./g. measured in 0.1 N KCl solution.

COMPARATIVE EXAMPLE B

The procedure of Example 4 was followed in every material detail except that in place of the fluoride monomer there was employed the chloride monomer, prepared as in Example 1.

The product obtained upon completion of the polymerization reaction was diluted to 10.1% solids. Recovery of polymer from a portion of the solution yielded 64% polymer, with about 2% residual monomer in the polymer. The polymer had an intrinsic viscosity of 1.20 dl./g. measured in 0.1 N KCl solution.

Comparing the results obtained in Example 4 and Comparative Example B, it is seen that under the same conditions of polymerization, in accordance with the present invention the diallyldimethylammonium fluoride monomer provides a polymer of higher intrinsic viscosity than does the diallyldimethylammonium chloride monomer. EXAMPLE 5

A fluoride monomer prepared as in Example 1 and in the form of a 50% aqueous solution was adjusted from pH 10.40 to 10.02 with 2N $H_2SO_4$. The monomer solution was charged to a suitable reactor and sparged with nitrogen for 45 minutes. The solution was then initiated by the addition of 0.25% of azobisisobutyronitrile as catalyst, based on the weight of monomer. The monomer solution was then heated over a period of 4 hours in a manner in which a temperature of about 50° C. was obtained in 36 minutes, a temperatures of 75° C. was obtained in 94 minutes, a temperature of about 97° C. was obtained in 160 minutes, and during the remaining heating time the temperature increased gradually to about 100.7° C. The reaction mixture was then cooled in a water-ice mixture to 20 ° C., diluted to 25% solids, and adjusted to pH 4.00 with 12 N $H_2SO_4$. The polymer obtained had an intrinsic viscosity of 7.2 dl./g. in 0.1 KCl solution, and 2.5 dl./g. when measured in 1.0 N / KCl solution.

EXAMPLE 6

The procedure of Example 5 was repeated in every material detail except that the catalyst employed was tertiary-butyl hydroperoxide at 0.12% based on the weight of the monomer.

The polymer obtained had an intrinsic viscosity of 2.6 dl./g. in 0.1 N KCl solution, and 1.3 dl./g. when measured in 1.0 N KCl solution.

We claim:

1. A process for preparing a polymer of diallyldimethylammonium fluoride having an intrinsic viscosity of at least about 0.1 deciliter/gram which comprises: providing an aqueous solution of about 10–70 weight percent of a substantially pure diallyldimethylammonium fluoride; purging said solution to remove oxygen therefrom; initiating polymerization of the purged monomer solution by addition thereto of a catalytic amount of a free-radical catalyst; conducting the polymerization reaction at a temperature of at least about 50° C. until a polymer of an intrinsic viscosity of at least about 0.1 deciliters/gram is obtained; and thereafter recovering the polymer thus prepared.

2. The process of claim 1 wherein during said conducting step continuous purging of oxygen is effected.

3. The process of claim 1 wherein said monomer solution contains about 50 weight percent of diallyldimethylammonium fluoride.

4. The process of claim 1 wherein said polymerization reaction is conducted until a polymer of an intrinsic viscosity of at least about 0.5 deciliter/gram is obtained.

5. The process of claim 1 wherein said polymerization reaction is conducted until a polymer of an intrinsic viscosity of at least about 2.0 deciliters/gram is obtained.

6. The process of claim 1 wherein said catalyst is tertiary-butyl hydroperoxide.

* * * * *